UNITED STATES PATENT OFFICE.

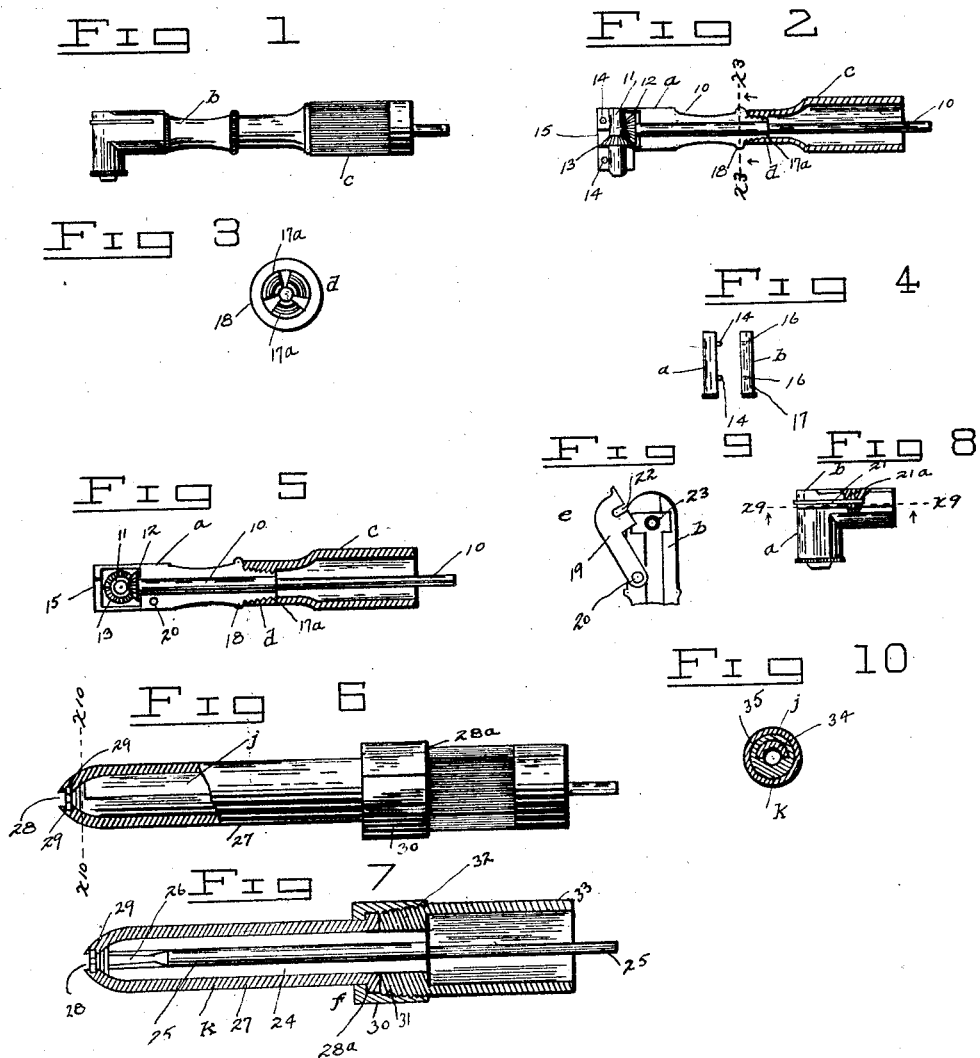

GEORGE M. HOLLENBACK, OF LEWISTOWN, MONTANA.

HANDPIECE FOR DENTAL INSTRUMENTS.

1,408,197.  Specification of Letters Patent. Patented Feb. 28, 1922.

Application filed July 11, 1918. Serial No. 244,467.

*To all whom it may concern:*

Be it known that I, GEORGE M. HOLLENBACK, a citizen of the United States, residing at Lewistown, in the county of Fergus and State of Montana, have invented new and useful Improvements in Handpieces for Dental Instruments, of which the following is a specification.

This invention relates to dental and surgical appliances, and it has for its object to provide improved appliances or implements for dental and surgical use so constructed and organized as to be capable of disassembling for the purpose of cleaning, lubricating and sterilizing the parts and features thereof, to prevent infection.

Instruments and appliances of this sort as heretofore constructed and used have been subject to the radical objection that the cavities and passages within the implements become invaded by germs and infection, which are readily carried into the interior portions of the appliances by the fluids encountered in use of the same in the mouth and in operating upon other portions of the anatomy. Such infection readily finds its way outwardly so as to expose person after person to danger from such infection. In accordance with the present invention I so construct and organize such appliances and implements that the same may readily be taken apart and the internal parts and working features removed so that the passages and cavities and chambers within such instruments, as well as the surfaces of the internal parts, may be thoroughly sterilized by subjecting the same to a high degree of heat or to steam action or a boiling water bath, and thus rendered thoroughly aseptic in condition. The invention has for further objects the provisions of improved instruments or appliances of the character stated, which will be generally superior in simplicity and inexpensiveness of construction and organization, taken in connection with facility and convenience in assembling and disassembling, and in general efficiency and serviceability and so as to enable effective sterilization, and in the respect that the use of such instruments to obtain the advantages of the invention will not interfere with the proper performance of the working functions of the devices.

With the above and other objects in view, the invention consists in the novel and useful provision, formation, combination, association and relative arrangement of parts, members and features, all as hereinafter described, shown in the drawing, and finally pointed out in claims.

In the drawing:

Figure 1 is a side elevation of a dental appliance, being an angular hand piece, the same being organized in accordance with the invention;

Figure 2 is a view of one side member of the casing or shell of the same, and of the internal working parts of the device, the other half or section of the shell having been removed in accordance with the invention;

Figure 3 is a detail transverse sectional view taken upon the line $x^3$—$x^3$, Figure 2, and looking in the direction of the adjacent arrows;

Figure 4 is an end view of the two sections of the outer shell or casing shown in Figures 1 and 2, in separate positions;

Figure 5 is a view similar to Figure 2, the casing or shell being subdivided in a plane at right angles to the plane of subdivision of such shell or casing in Figure 2;

Figure 6 is a side elevation of a modified form of the invention showing the same applied to a straight hand piece for dental uses;

Figure 7 is a longitudinal central sectional view of the construction shown in Figure 6;

Figure 8 is a fragmentary view of the outer end portion of the angular hand piece shown in Figure 1, illustrating locking means applied thereto for holding the dental drill in position in the hand piece;

Figure 9 is a detail longitudinal sectional view taken upon the line $x^9$—$x^9$, Figure 8, and looking in the direction of the adjacent arrows; and, Figure 10 is a detail transverse sectional view taken on a line $x^{10}$—$x^{10}$, Figure 6.

Referring with particularity to the drawing, and to Figures 1 to 4 thereof, the dental appliance therein shown in illustration of one form of embodiment of the invention, comprises an outer shell or casing having two members $a$ and $b$, which are matched to be fitted together to enclose the drill operating internal parts, such as the main drive shaft 10 and the driven shaft 11, to which the drill or working member is applied. These two shafts are rotatably connected by means of meshing bevel gears 12 and 13, likewise accommodated in suitable recesses in the members *a* and *b* of the casing. The shaft 11 is in angular relation to the shaft 10, in this form of so-called hand piece. Dowel pins 14 upon the outer angled end 15 of the casing member *a* are adapted to enter registering recesses 16 upon the outer matched angled end portion 17 of the member *b*. These together with a releasable locking and holding member *d* serve to hold the members *a* and *b* in assemblage, but to permit their disassemblage for purpose of sterilization, cleaning and lubricating the internal working parts of the implement. Such member *d* comprises a coarse interrupted threaded taper joint between the members *a* and *b* and a handle member *c* through which the main shaft 10 leads from the inner end of the implement where it receives its power by suitable connection. The coarse interrupted or segmentally subdivided taper threads 17a upon such handle member *c* match similar threads similarly formed and interrupted or segmentally subdivided upon the members *a* and *b* whereby in accordance with the formation and arrangement shown in the drawing, a one-third turn of the handle member *c* will cause either the disengagement or engagement of the threads of such member with the threads of the members *a* and *b*. When these threads are interengaged the members *a* and *b* are held effectively in assemblage, the dowel pins 14 and the recesses 16 assisting. A flange formation 18 upon the members *a* and *b* forms an abutment against which the handle member *c* bears when in position.

Referring to the construction shown in Figure 5, the construction and formation and interrelation of parts and features is the same as in Figures 1 to 4, inclusive, with the exception that the plane of separation or separability of the members *a* and *b* is at right angles to the corresponding plane in the aforementioned figures. In Figures 8 and 9 are disclosed in detail a locking means *e* applicable to the members *a* and *b*, either in Figures 1 to 4, inclusive, or in Figure 5, but particularly arranged to be applicable to the shell or casing subdivision shown in Figure 5. Such locking means *e* comprise a pivoted latch 19 pivoted as at 20 upon the member *b*, adjacent to the outer angled end thereof, and within a slot 21 produced inwardly of the member *a*, such latch having a notch or recess 22 adapted to take into a contracted portion of the drill 23 so as to hold the same from endwise displacement. Referring to Figures 6 and 7, there is shown therein a straight dental hand piece, the casing 24 of which encloses the drive shaft 25 having a chuck 26 or other substitute for receiving the drill or other working part. Applied over such casing 24 is a protective sleeve or sheath 27 having an opening at its outer end at 28 for the accommodation of the drill or other tool, so that the latter may be received and accommodated by the chuck or equivalent 26. Set into such sleeve 27 just inward of the opening 28, in a suitable annular groove 29, is a rubber or elastic or compressible gasket or washer the normal size of the opening in which is slightly less in diameter than that of the tool which is to pass through the same and through the opening 28. A nut 30 slips over the sleeve 27 and into engagement with a flange 28a upon such sleeve and has an internal coarse tapered segmentally subdivided threaded formation 31 which interengages with a similarly threaded formation 32 upon a handle member 33 which surrounds the drive shaft 25, a joint *f* similar to the union or joint *d* shown in Figures 2 and 3 being thus provided, whereby the handle member and the sleeve 25 are firmly and separably attached together, the end of the handle member 33, including the threads 32, abutting against the flange 28a upon the sleeve 27.

In correspondence with the construction shown in the other figures, the casing or shell 24 is subdivided longitudinally in midsection to provide upper and lower members or sections, these being matched together, the upper member *j* having its outer forward end reduced to provide a nose 34, which fits into an annular socket 35, projecting laterally from the corresponding forward end of the member *k*. This construction and inter-relation of parts, together with the joint *f*, serves to lock such members *j* and *k* together and confine them within the sleeve or sheath 27.

The method of use, operation and advantages, of the improvements in dental and surgical appliances and implements constituting the invention, will be readily understood by the exemplary description and the accompanying drawing, taken together with the following statement:

Referring to Figures 1 to 5 inclusive, and 8 and 9, the shell or casing members *a* and *b* are detachably and yet firmly held together by the dowel pins and recesses 14 and 16, assisted by the taper joint at *d*, so that the members may readily be assembled together or disassembled for purpose of sterilizing, cleaning and lubricating. The latch means, *e*, may readily be manipulated, either to engage and hold from endwise displacement, or to liberate, the drill or tool 23. The pivot formation at 20 consists of a dowel pin fitted into the member *b* and passing through the slot 21 and entering a suitable recess in the member *a*, as indicated at 21a in the broken away portion of the showing of Figure 8.

Referring to Figures 6, 7 and 10, the shell or casing members 24 are firmly held together by the tongue engagement at 34 and 35, at the outer ends of such members, and the sheath or sleeve 27 assists in maintaining this assemblage, which is completed by the action of the joint $f$. The parts may readily be disassembled by breaking the joint $f$—$e$ and removing the sleeve 27. The washer 29 assists in preventing invasion of infection, or any moisture or substance whatsoever of any space within the sleeve 27 or within the cavities or passages within or between the members $j$ and $k$.

Both joints $d$ and $f$ permit of quick and convenient assembling and disassembling of the parts of the implements, so that the same may be cleaned, sterilized, and lubricated frequently, to keep the implement in proper working condition and entirely prevent spread of infection.

It is manifest that many variations, substitutions and modifications may be made, all with respect to the specific construction and organization disclosed in the drawing and hereinabove described, in adapting the invention to varying conditions of use and service, without departing from the true spirit of the invention.

Having thus described my invention, I claim and desire to secure by Letters Patent:

1. A dental handpiece including a tubular casing having an angularly disposed head which is divided longitudinally into complemental sections, said sections being correspondingly recessed to provide angularly disposed bearings and a chamber, shafts journaled within the said bearings and removable when the complemental sections are separated from each other, intermeshing gearing applied to the shafts and housed within the before-mentioned chamber, and quickly detachable locking means for holding the complemental sections together, said complemental sections being adapted to be bodily disengaged from each other and separated when the locking means is released, said locking means including a handle formed with a part adapted to have a threaded engagement with an end of the angularly disposed head.

2. A dental handpiece including a tubular casing having an angularly disposed head which is divided longitudinally into complemental sections, said sections being adapted to be bodily disengaged from and separated from each other, shafts and intermeshing gearing fitted in the said head, the shafts having an angular relation to each other and the shafts and gearing being bodily removable when the casing sections are separated, and locking means for holding the sections together, said locking means including a handle formed with a part adapted to have a threaded engagement with an end of the angularly disposed head.

3. A dental handpiece including a tubular casing which has an angularly disposed head and is divided longitudinally into complemental sections, said sections being adapted to be bodily disengaged and separated from each other, angularly disposed shafts and intermeshing gearing fitted in the head and arranged to be bodily removable when the casing sections are separated, a handle formed with a part adapted to have a threaded engagement with one end of the tubular casing and hold the complemental sections thereof together, and a positioning pin projecting from one of the sections at the opposite end of the head, the other section being provided with a corresponding opening which receives the positioning pin.

4. A dental handpiece, including a tubular casing provided with an angularly disposed end, which tubular casing is divided longitudinally into complemental sections, said sections being adapted to be bodily disengaged and separated from each other, and means for maintaining the complemental sections in locked alignment; said means including a handle provided with a part adapted to engage an end of the tubular casing for maintaining the sections thereof in locked alignment, and positioning pins projecting from and carried by one of the sections at the angularly disposed portion of the tubular casing, the other section being provided with corresponding openings which receive the positioning pins.

In testimony whereof, I have signed my name to this specification in the presence of two subscribing witnesses.

GEORGE M. HOLLENBACK.

Witnesses:
RAYMOND IVES BLAKESLEE,
MILDRED LEACH.